United States Patent
Kuzmin et al.

(10) Patent No.: US 9,233,319 B2
(45) Date of Patent: Jan. 12, 2016

(54) APPARATUS AND PROCESS FOR CONTACTING LIQUIDS

(71) Applicants: UOP LLC, Des Plaines, IL (US); Boreskov Institute of Catalysis, Siberian Branch of Russian Academy of Sciences, Novosibirsk (RU)

(72) Inventors: Andrey Kuzmin, Novosibirsk (RU); Aziz Sattar, West Chicago, IL (US); Lev Davydov, Northbrook, IL (US)

(73) Assignees: UOP LLC, Des Plaines, IL (US); BORESKOV INSTITUTE OF CATALYSIS, Novosibirsk (RU)

( * ) Notice: Subject to any disclaimer, the term of this patent is extended or adjusted under 35 U.S.C. 154(b) by 520 days.

(21) Appl. No.: 13/709,376

(22) Filed: Dec. 10, 2012

(65) Prior Publication Data

US 2014/0158644 A1 Jun. 12, 2014

(51) Int. Cl.
 *B01D 17/038* (2006.01)
 *B01D 17/04* (2006.01)
 *B01F 5/00* (2006.01)
 *B01D 17/02* (2006.01)

(52) U.S. Cl.
 CPC .......... *B01D 17/045* (2013.01); *B01D 17/0217* (2013.01); *B01F 5/0057* (2013.01)

(58) Field of Classification Search
 CPC .. B01D 17/0217; B01D 17/045; B01F 5/0057
 See application file for complete search history.

(56) References Cited

U.S. PATENT DOCUMENTS

| | | | |
|---|---|---|---|
| 2,659,664 A | 11/1953 | Works et al. | |
| 3,784,009 A | 1/1974 | Maciula | |
| 3,867,103 A | 2/1975 | Boney et al. | |
| 4,604,988 A | 8/1986 | Rao | |
| 5,098,668 A | 3/1992 | Callen et al. | |
| 5,405,497 A | 4/1995 | Torregrossa | |
| 5,462,639 A | 10/1995 | Matthews et al. | |
| 5,628,901 A * | 5/1997 | Lawrence et al. | 210/251 |
| 6,241,809 B1 | 6/2001 | Hopkins | |
| 6,303,843 B1 | 10/2001 | Anderson et al. | |

(Continued)

FOREIGN PATENT DOCUMENTS

| | | |
|---|---|---|
| CN | 2628149 Y | 7/2004 |
| EP | 1406731 | 5/2005 |

(Continued)

OTHER PUBLICATIONS

Am Ende et al, "Interfacial Area of Dispersions of Sulfuric Acid and Hydrocarbons", Industrial & Engineering Chemistry Research, Dec. 1995, vol. 34, No. 12, pp. 4343-4350.

(Continued)

*Primary Examiner* — David A Reifsnyder
(74) *Attorney, Agent, or Firm* — James C. Paschall

(57) ABSTRACT

One embodiment can be an apparatus for contacting a first liquid and a second liquid. The apparatus can include a vessel, which in turn, may include at least one wall, a first member, and a funnical frustum. The at least one wall can form a perimeter about an interior space. Also, the first member can be positioned within the interior space and form a plurality of passageways. Each passageway may be bordered by a first side and a second side from an outer region to an interior surface of the first member. Generally, the funnical frustum is positioned downstream of the first member to facilitate a swirling of at least one of the first and second liquids.

13 Claims, 4 Drawing Sheets

(56) References Cited

U.S. PATENT DOCUMENTS

| | | | |
|---|---|---|---|
| 6,322,763 | B1 | 11/2001 | McDaniel |
| 6,430,937 | B2 | 8/2002 | Cho et al. |
| 6,464,210 | B1 | 10/2002 | Teran et al. |
| 6,576,029 | B2 | 6/2003 | West |
| 6,709,500 | B1 | 3/2004 | West |
| 6,811,713 | B2 * | 11/2004 | Arnaud ............ 210/512.1 |
| 6,852,902 | B2 | 2/2005 | Smith, Jr. |
| 7,126,038 | B2 | 10/2006 | Smith, Jr. |
| 7,326,333 | B2 | 2/2008 | Laricchia et al. |
| 7,381,309 | B1 * | 6/2008 | Laricchia et al. ...... 210/198.1 |
| 8,028,975 | B2 | 10/2011 | Tertel et al. |
| 2009/0115076 | A1 | 5/2009 | Makhotkin et al. |
| 2009/0221863 | A1 | 9/2009 | Strauss et al. |
| 2009/0283474 | A1 | 11/2009 | Achard et al. |
| 2010/0258427 | A1 | 10/2010 | Towler |
| 2011/0239862 | A1 | 10/2011 | Davydov |
| 2012/0000827 | A1 | 1/2012 | Krupa et al. |
| 2012/0118818 | A1 * | 5/2012 | Moraes et al. ......... 210/512.1 |

FOREIGN PATENT DOCUMENTS

| | | | |
|---|---|---|---|
| GB | 2430637 | A | 4/2007 |
| KR | 972921 | | 7/2010 |
| RU | 2071839 | C1 | 1/1997 |

OTHER PUBLICATIONS

Baird et al., "Liquid-Liquid Extraction Using Vortex Rings in a Batch Cell", Trans IChemE, Jul. 1992, vol. 70, No. A4, pp. 323-332.

Abstract of CN 1490070 Publication Date Apr. 21, 2004 by Zhang Wenfei.

Abstract of CN 201258914 Publication Date Jun. 17, 2009 by Luoyang Siyite Bearing Co. Ltd.

Abstract of CN 2573055 Publication Date Sep. 17, 2003 by Zhang Wenfei.

Martin et al., "Tangential Flow Development for Laminar Axial Flow in an Annulus With a Rotating Inner Cylinder", Proc. R. Soc. Lond. A., May 2, 1972, vol. 328, No. 1572, pp. 123-141.

"Vortex De-Pollution System—The Leading Solution That Meets UK Legislation Requirements", at www.vortexdepollution.com/lpg.html, 2008, p. 6 screen pages.

"LPG Recovery from End of Life Vehicles", at www.atfprofessional.co.uk/lpgrecovery.aspx, p. 1 screen page.

Weinstein et al., "Liquid-Liquid Contacting in Unbaffled, Agitated Vessels", AIChE Seventy-Fourth National Meeting New Orleans, LA, Mar. 11, 1973, Volume Paper, No. 91A, p. 40 Pages.

* cited by examiner

APPARATUS AND PROCESS FOR CONTACTING LIQUIDS

FIELD OF THE INVENTION

This invention generally relates to an apparatus and process for contacting liquids.

DESCRIPTION OF THE RELATED ART

Generally, liquid extraction and reaction processes have been widely employed using liquid-liquid mixing in refining and chemical technologies. Such mixing technologies can be utilized for the desulfurization of liquid hydrocarbons, hydrogen fluoride alkylation for producing gasoline blends, and any other suitable process requiring the blending of liquids. Often, the mixing of two immiscible liquids may facilitate a chemical reaction, or extract a substance, such as sulfur, from one liquid phase into the other. Typically, intimate mixing and contacting between immiscible phases followed by an efficient liquid-liquid phase separation is desired for accomplishing the desired reaction and/or separation.

Usually, the liquid-liquid extractors may only perform the extraction function. As an example, static mixers may provide efficient mixing, but often a settling vessel is required downstream in the mixture to separate the two liquid phases. Mixing in a stirred tank can also be very efficient, but the impeller action may result in emulsification slowing separation of the two liquids afterwards. A further mechanism for extraction can be packed bed columns. Another alternative is a vertical tray column used for liquid-liquid extraction that can offer suitable efficiency due to minimum back mixing. However, sufficient space between each tray is typically required for immediate phase separation and to prevent bypassing of a tray by a solvent. Also, the tray column may have limited turn-down capability and require some settling volume after the last trays for producing a fine phase separation. Additionally, overflow weirs and downcomers can take up additional space inside the column and reduce the effective tray area. As such, the tray column height can be quite long and diameter is larger than theoretical to accommodate the internals. The height of the column can make it unsuitable for modulation and substantial resources may be required to erect the column in the field and to make the required connections.

As described above, it is desirable to find a liquid-liquid mixing and separation apparatus that can be compact and provide robust performance, and a process corresponding thereto.

SUMMARY OF THE INVENTION

One embodiment can be an apparatus for contacting a first liquid and a second liquid. The apparatus can include a vessel, which in turn, may include at least one wall, a first member, and a funnical frustum. The at least one wall can form a perimeter about an interior space. Also, the first member can be positioned within the interior space and form a plurality of passageways. Each passageway may be bordered by a first side and a second side from an outer region to an interior surface of the first member. Generally, the funnical frustum is positioned downstream of the first member to facilitate a swirling of at least one of the first and second liquids.

Another embodiment may be an apparatus for contacting a first liquid and a second liquid. The apparatus can include a vessel, which in turn can include at least one wall and a distributor. The at least one wall may form a perimeter about an interior space, and the distributor can be positioned within the interior space. The distributor can include a substantially circular plate.

A further embodiment may be a process for contacting first and second immiscible liquids in a vessel. The process can include providing the first liquid into a tube entering a head of the vessel, providing the second liquid into a shell surrounding the tube entering the head of the vessel, passing the first and second liquids to a ring-shaped member forming a plurality of passageways from an outer region to an inner surface of the ring-shaped member, passing the first and second liquids through a funnical frustum to a distributor, and passing the first and second liquids from the distributor to a coalescer positioned below.

A liquid-liquid vortex contactor can produce a highly dispersed liquid-liquid mixture in a field of centrifugal forces inside a vortex zone to provide intimate contact between two liquid phases for facilitating a liquid-liquid reaction or extraction. The turbulence in the vortex can result in a very large interfacial area for chemical reaction or mass transfer, typically an attractive characteristic for liquid-liquid extraction. In one exemplary embodiment, an almost 100% of a theoretical extraction may be achieved.

Generally, the operation of a liquid-liquid vortex contactor can be based on the rotation of two liquids. In general, the tangential motion of mode of a first liquid (continuous phase) can be used to swirl and break up a second liquid (dispersed phase). As a consequence, it is possible to approach one theoretical stage in a vortex contactor.

Desirably, the vortex contactor provides sufficient yet not excessive shear to reduce the volume required for subsequent phase separation. The proposed liquid-liquid mixer and contactor design can utilize a vortex. As such, a suitable design is typically desired to reduce the size and cost of liquid-liquid extractors.

DEFINITIONS

As used herein, the term "stream" can include various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons. Moreover, the hydrocarbon molecules may be abbreviated C1, C2, C3 . . . Cn where "n" represents the number of carbon atoms in the one or more hydrocarbon molecules. Furthermore, a superscript "+" or "−" may be used with an abbreviated one or more hydrocarbons notation, e.g., $C3^+$ or $C3^-$, which is inclusive of the abbreviated one or more hydrocarbons. As an example, the abbreviation "$C3^+$" means one or more hydrocarbon molecules of three carbon atoms and/or more. The stream may include substances in addition to or other than one or more hydrocarbons, such as an alkaline, an acid, and/or water.

As used herein, the term "zone" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

As used herein, the term "rich" can mean an amount of generally at least about 50%, and preferably about 70%, by mole, of a compound or class of compounds in a stream. If referring to a solute in solution, e.g., one or more thiol compounds in an alkaline solution, the term "rich" may be referenced to the equilibrium concentration of the solute. As an example, about 5%, by mole, of a solute in a solvent may be considered rich if the concentration of solute at equilibrium is 10%, by mole.

As used herein, the term "substantially" can mean an amount of generally at least about 80%, preferably about 90%, and optimally about 99%, by mole, of a compound or class of compounds in a stream. If referring to a solute in solution, e.g., one or more thiol compounds in an alkaline solution, the term "substantially" may be referenced to the equilibrium concentration of the solute. As an example, about 8%, by mole, of a solute in a solvent may be considered substantial if the concentration of solute at equilibrium is 10%, by mole.

As used herein, the term "frustum" can mean a solid figure formed when a plane, which is substantially parallel to a base or a top of a cone, a pyramid, and a funnel, sections the shape. With respect to the term "funnical frustum", the sectioning plane can pass through a conical portion of the funnel and be substantially parallel to another plane perpendicular to the mouth of the funnel.

As used herein, the term "coupled" can mean two items, directly or indirectly, joined, fastened, associated, connected, or formed integrally together either by chemical or mechanical means, by processes including stamping, molding, or welding. What is more, two items can be coupled by the use of a third component such as a mechanical fastener, e.g., a screw, a nail, a staple, or a rivet; an adhesive; or a solder.

As described herein, the term "coalescer" can be a device containing at least one of a metal mesh, one or more vanes, one or more glass fibers, sand, and anthracite coal to facilitate separation of immiscible liquids of similar density. These components may be constructed of or coated with materials that exhibit hydrophobic-oleophilic characteristics.

As used herein, the term "g-force" can be abbreviated "g" and mean the angular acceleration imparted to a liquid and can be in units of meter per second squared (abbreviated $m/s^2$). One "g" can equal 9.8 $m/s^2$.

As used herein, the term "cross-sectional" may refer to a view of only a slice or portion of a component or apparatus without depicting underlying elements.

As used herein, the term "immiscible" can describe substances of the same phase or state of matter that cannot be uniformly mixed or blended. As an example, such immiscible mixtures can include liquids such as oil and water, or an alkali or alkaline solution, such as a water solution of sodium or potassium hydroxide, or of ammonia, and hydrocarbon.

DETAILED DESCRIPTION

The apparatus as disclosed herein can facilitate the extraction of a component from two immiscible liquids. Although densities may be similar, one liquid is typically heavier than the other. Usually, the first liquid can be lighter and less dense and the second liquid may be heavier and denser. Often, the first liquid can be at least one hydrocarbon, such as naphtha, hexane, dodecane, and a liquefied petroleum gas; and the second liquid can be water or an acidic or an alkaline solution thereof, such as a sodium or potassium hydroxide or an ammonia solution. Generally, the first liquid contains a substance to be extracted, such as one or more sulfur compounds, and/or reacted. Often, the substance is extracted from the hydrocarbon liquid into an alkaline solution. Examples can include contacting a liquefied petroleum gas containing one or more sulfur compounds and a solution of sodium or potassium hydroxide, or of ammonia, a liquefied petroleum gas containing one or more sulfur compounds and water, or one or more C3-C10 hydrocarbons, such as hexane, containing one or more sulfur compounds and water. The embodiments disclosed herein can combine liquid introduction and mixing, phase separation, and coalescing, into single integrated housing.

Also, the apparatus as disclosed herein can be utilized for contacting two immiscible liquids for facilitating reaction, such as alkylation, with an acid catalyst, such as hydrofluoric acid or sulfuric acid. Although two liquids are described as being utilized in the apparatus, it does not exclude the inclusion of a third or additional liquids for facilitating the reactions and/or extractions.

Figure 1:
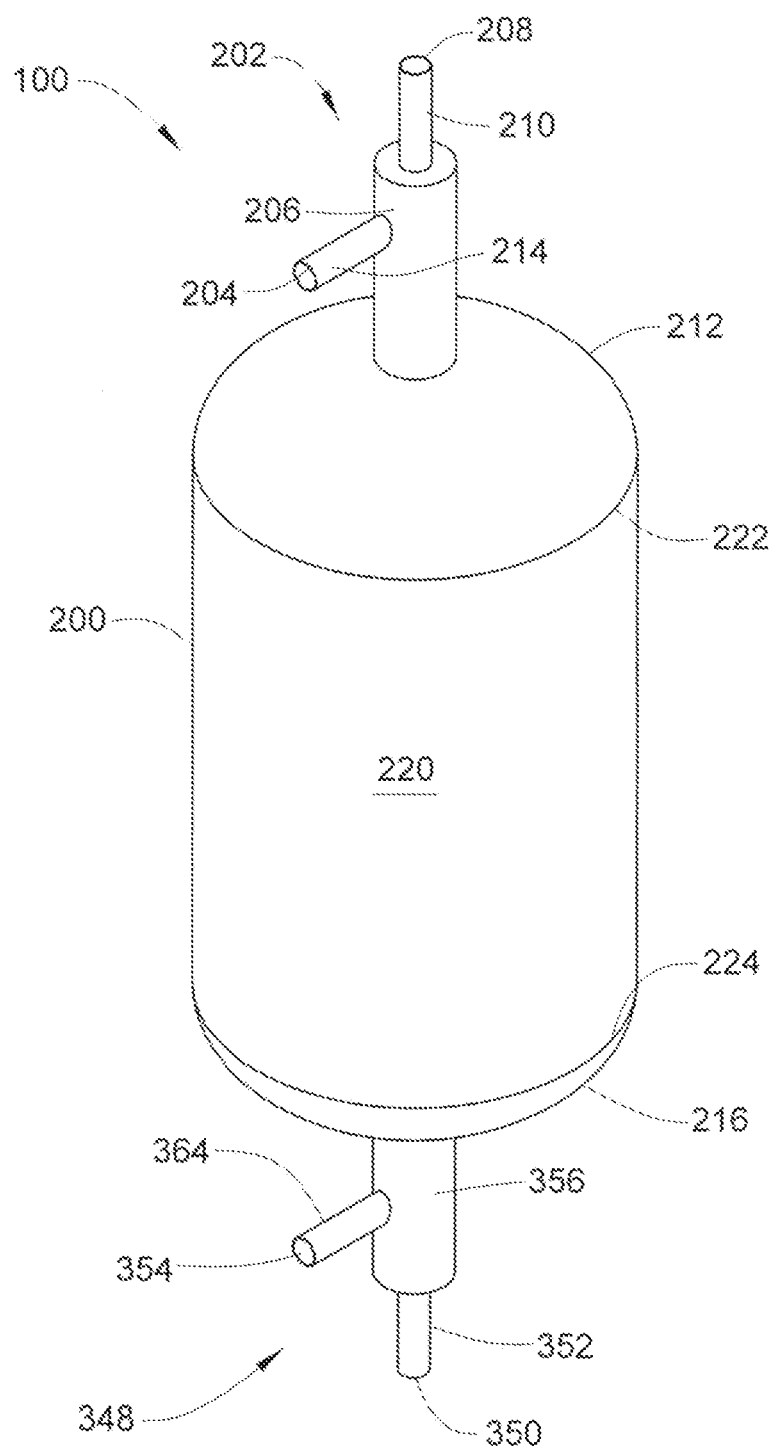
FIG. 1 is a perspective view of an exemplary apparatus.
Figure 2:
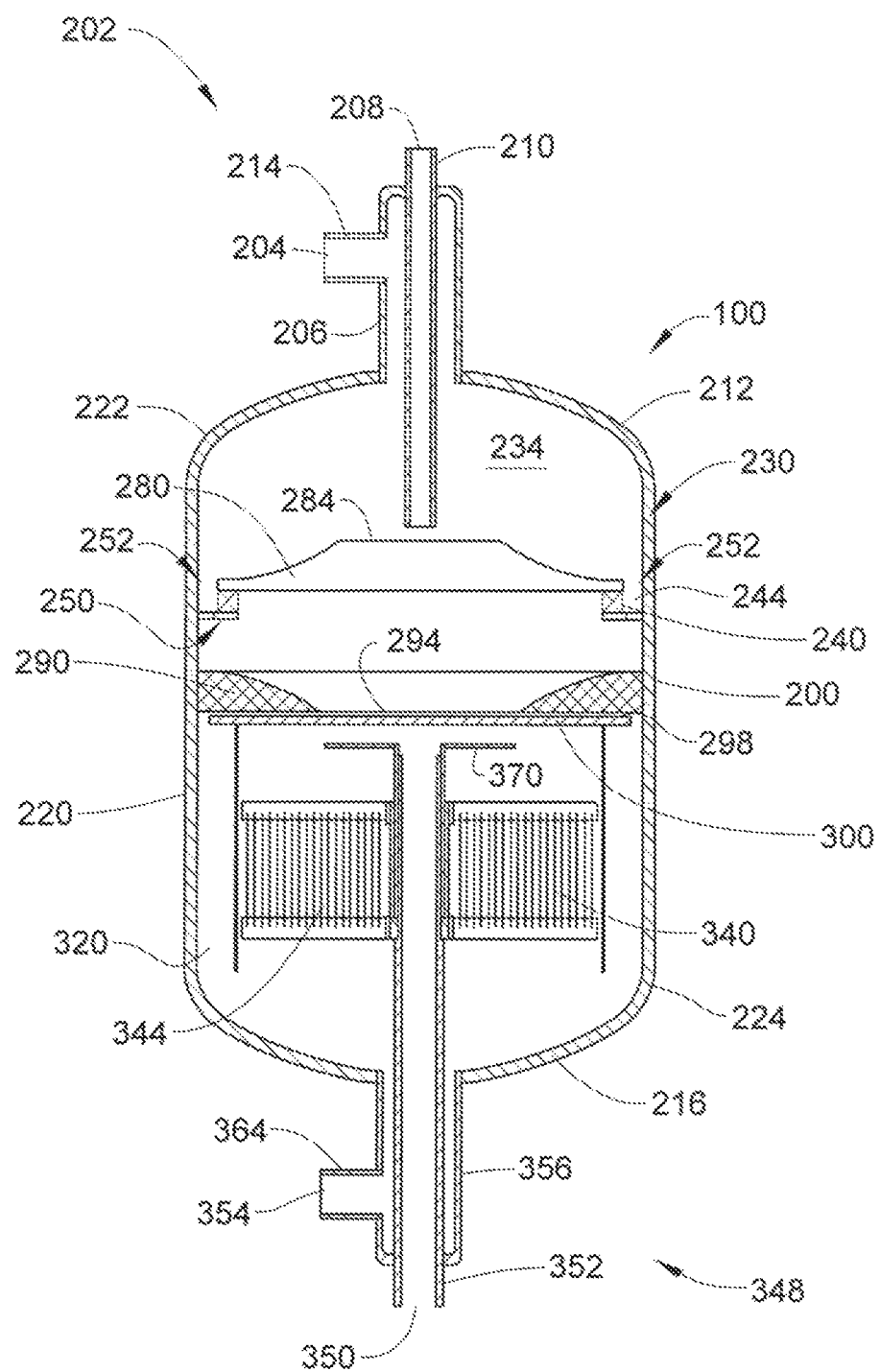
FIG. 2 is an elevational, cross-sectional view of the exemplary apparatus.

Referring to FIGS. 1-2, an exemplary apparatus 100 for mixing and contacting a first liquid and a second liquid with the liquids typically being immiscible can occur in a vessel 200. Generally, the vessel 200 includes at least one inlet 202, such as a first inlet 204 and a second inlet 208, and at least one outlet 348 may include a first outlet 350 and the second outlet 354. The vessel 200 can include a head 212, a bottom 216, and at least one wall 220. Generally, the at least one wall 220 can be coupled at either end to the head 212 and the bottom 216. Usually, the at least one wall 220 forms a substantially cylindrical outer surface that can be coupled to the hemispherical head 212 at one end 222 and the hemispherical bottom 216 at the other end 224.

Both the inlets 204 and 208 and outlets 350 and 354 can form tube-and-shell constructions. Particularly, the first inlet 204 and the second inlet 208 can form, respectively, a shell 206 and a tube 210 configuration. Generally, the tube 210 is inserted into the shell 206, which can receive a first liquid via a pipe 214 while the tube 210 can receive a second liquid via the second inlet 208. Similarly, the at least one outlet 348 can include the first outlet 350 and the second outlet 354. Particularly, a tube 352 for the first outlet 350 can be inserted into a shell 356 of the second outlet 354. A pipe 364 can be coupled to the shell 356 for permitting liquid to leave the shell 356. The head 212, the at least one wall 220, and the bottom 216, can be formed integrally together to form an inner perimeter 230 as well as an interior space 234 for housing additional components of the vessel 200.

In one exemplary embodiment, the vessel 200 can include a frustum 280, preferably conical, a first member or swirler 240, a frustum 290, preferably funnical, a distributor 300, and a coalescer 340. Generally, the tube 210 extends into the interior space 234 while the shell 206 can terminate at the head 212. The first or hydrocarbon liquid can enter the shell 206 and fill the interior space 234 upstream of the first member 240.

Figure 3:
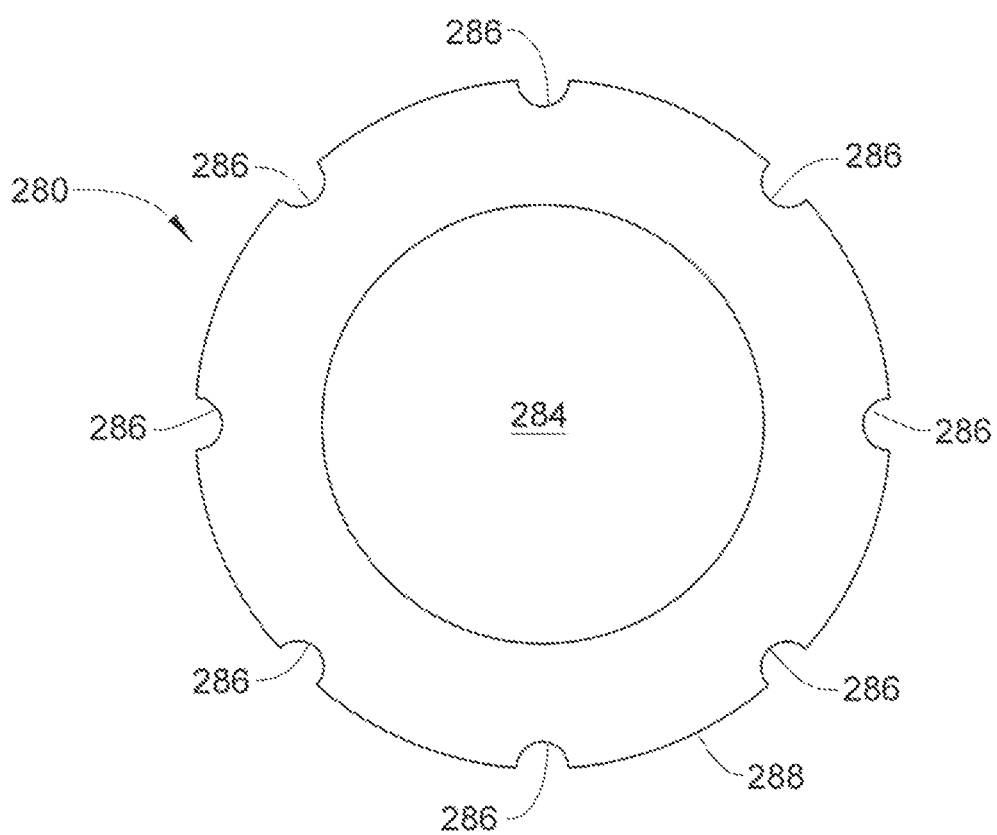
FIG. 3 is a top, plan view of an exemplary conical frustum.

The second or alkaline liquid may enter the tube 210 and impinge the conical frustum 280, as depicted in FIG. 3. Although the frustum 280 is disclosed as being conical, it should be understood that any suitable shape may be utilized, such as a splash member shaped as a disc, rectangular plate, or prism. As such, the splash member can include a variety of shapes, including the frustum 280. The conical frustum 280 may have a top surface 284 and a substantially circular plate perimeter 288 forming a plurality of one or more cutouts 286. Although the one or more cutouts 286 are depicted as crescents, the one or more cutouts can, independently, take any suitable shape, such as crescents, triangular, and/or round. The first and second liquids may mix and be directed to a perimeter 230 formed by the at least one wall 220. The liquids can fall over the edge of the frustum 280 and enter the first member 240. Generally, the perimeter 230 can be substantially circular from a plan, cross-sectional view, as depicted in FIG. 2. Although the edge of the frustum 280 is depicted as flush with the edge of the swirler 240, in other embodiments the edge of the frustum 280 may be extended to overhang the edge of the swirler 240, while leaving a gap between the edge of the frustum 280 and the wall 220.

Figure 5:
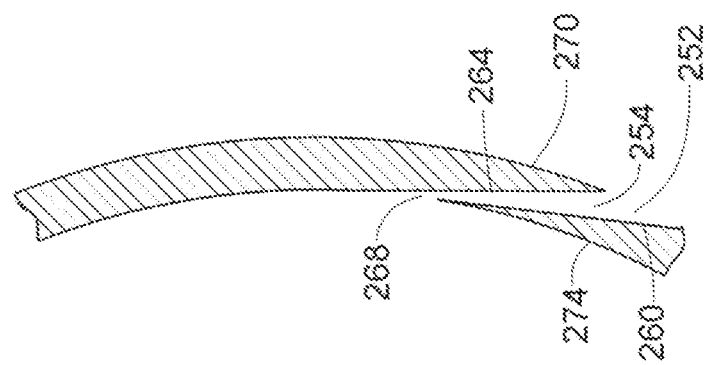
FIG. 5 is an enlarged view of a slice of the exemplary first member as depicted in FIG. 3.
Figure 4:
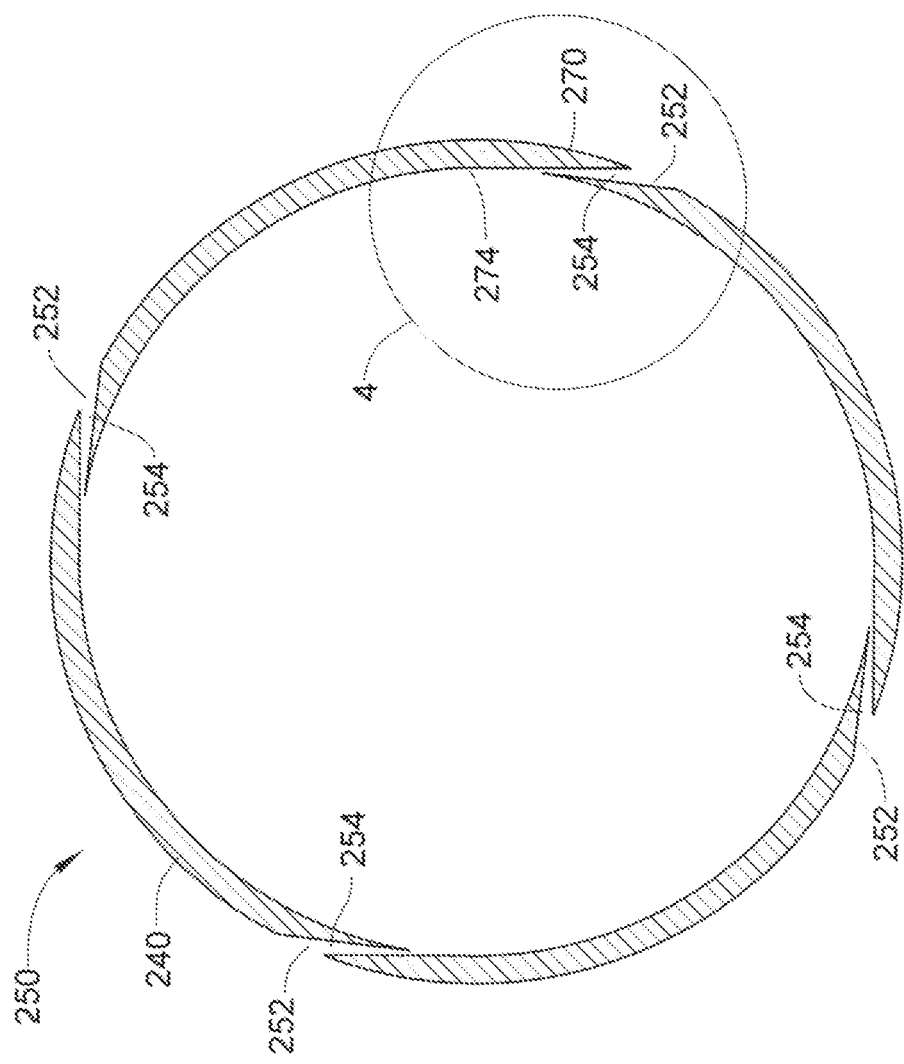
FIG. 4 is a top, plan view of a slice of an exemplary first member.

Referring to FIGS. 2, and 4-5, the first member 240 can be positioned within the interior space 234 and reside downstream and positioned proximate to the conical frustum 280. The first member 240 may be a separate component or formed integrally with other components, such as the at least one wall 200. Generally, the first member 240 forms one or more openings 252 to allow liquids flowing off the conical frustum 280 filling a circular trough 244 to enter one or more openings 252 of the first member 240.

Often, the first member 240 imparts a swirl to the first and second liquids passing from an outer region 270 to the inner surface 274 of the first member 240. Usually, the first member 240 forms a plurality 250 of passageways 254 where each passageway 254 can taper narrowing in a direction from an outer region 270 to an inner surface 274 of the first member 240.

Referring to FIG. 5, each passageway 254 can be defined by a first side 260 spaced apart from a second side 264 that tapers each passageway 254 to form a slot 268. Thus, a swirling motion can be imparted to the first and second liquids entering the outer region 270 of the first member 240, passing into each passageway 254 and exiting a slot 268 formed in the inner surface 274 of the first member 240.

Alternatively, the first side 260 can form vanes at an angle of about 90-about 180° with respect to one another that can further taper the passageway 254. In addition, each side 260 and 264 can, independently, be considered a vane. The tapering of the passageway 254 can facilitate accelerating and imparting a circular motion to the first and second liquids. The sides 260 and 264 can be formed integrally with the first member 240, or formed as separate components and coupled together to at least partially comprise the first member 240.

The funnical frustum 290 can be positioned downstream from the first member 240 and receive liquid therefrom. Generally, the funnical frustum 290 can abut the perimeter 230 of the vessel 200 and direct liquid toward its center. The funnical frustum 290 can form a curvature for facilitating the formation of a vortex. The funnical frustum 290 may also collect liquids from the first member 240. At least a portion of the curvature can resemble, in a cross-section, at least a portion of a mordell or parabolic curve. Generally, the cross-section of the funnical frustum 290 can resemble any suitable bell curve. Although a parabolic profile is depicted other suitable profiles can include a rectangular, a conical, or a concave profile. Usually, the funnical frustum 290 forms an opening 294 above or upstream of the distributor 300 for providing liquid therebelow.

The distributor 300 can be positioned below or downstream of an opening 294 formed by the funnical frustum 290. The distributor 300 may form a substantially circular plate or disk shape, although any suitable shape may be utilized. Generally, the distributor 300 includes a substantially circular plate that receives the liquids spilling from the funnical frustum 290. The surface of the distributor 300 can be smooth to facilitate a laminar flow of liquids spreading across its surface.

The distributor 300 and funnical frustum 290 can also form a narrow passageway 298 underneath the funnical frustum 290 to reduce the velocity and laminarize the flow to aid in further phase separation. The liquid can flow from the interior of the substantially circular distributor 300 towards its periphery positioned proximately to the perimeter 230 of the vessel 200. Liquid can flow over the periphery to the space downstream of the distributor 300. This space can be a coalescence annulus 320 formed by the at least one wall 220 and an outer wall of the coalescer 340. The coalescence annulus 320 may form a volume that can permit primary phase separation of the first and second liquids by gravity-driven settling of coalesced droplets.

Downstream of the distributor 300 can be the coalescer 340. Generally, the coalescer 340 can be any suitable material, but desirably the coalescer 340 includes a stainless steel mesh 344, optionally coated with a hydrophobic substance. Typically, the coalescer 340 is constructed from any suitable media, such as mesh, nets, cartridge, foam, and/or laminarizing channels.

Generally, the funnical frustum 290 can be positioned at predetermined distance from the first member 240. Typically, the funnical frustum 290 may be positioned no more than one diameter, one-half diameter, or one-quarter diameter of the vessel 200. In other exemplary embodiments, the funnical frustum 290 can be positioned proximate or adjacent to the first member 240.

The outlet tube 352 can extend upwards into the interior space 234 to provide an inlet that can reside downstream of the distributor 300. Optionally, the tube 352 may be capped with a circular plate 370 forming an opening in the center therein at an inlet to the outlet tuber 352.

In operation, a first liquid can be provided within a first inlet 204 and a second liquid can be provided to the second inlet 208. The first and second liquids are introduced upstream of the first member 240. Typically, the first liquid can fill the interior space 234 upstream of the first member 240. Often, the second liquid impinges upon a surface 284 of the conical frustum 280. The first and second liquids can at least partially mix and travel toward the perimeter 230 of the vessel 200, and flow off the conical frustum 280.

The first and second liquids may fill the trough 244 and pass into the multiple openings 252 of the first member 240 and subsequently pass through each passageway 254 to exit the slot 268 past the inner surface 274 of the first member 240. The contacted first and second liquids encounter the outwardly tapered sides 260 and 264 designed to accelerate the rotational motion forcing the denser second liquid toward the perimeter 230 and partially stratify the flow. Thus, a swirling motion can be imparted to the liquids, which can form a vortex facilitating contacting and separating of the two liquids. During contacting of the first and second liquids, a component can be extraction into the second liquid from the first liquid. Subsequently, the partially stratified liquids can drop to the funnical frustum 290 and be directed toward the opening 294 in the center.

The first and second liquids can pass the opening 294 and spread across the distributor 300 to its periphery. Thus, the liquid can form a laminar flow and aid separation of the two immiscible phases with the liquid passing close to the perimeter 230 of the vessel 200 and dropping below and toward the bottom 216 of the vessel 200. Usually, the second liquid settles at the bottom 216 of the vessel 200 and exits through a shell 356 and a pipe 364 along with any extracted component. Generally, the second liquid is not permitted to accumulate beyond a certain level and is continually drained from the bottom 216 of the vessel 200.

Meanwhile, the mixture of the two liquids can fall in the coalescence annulus 320 and then rise while passing through the coalescer 340. The coalescer 340 can further facilitate separation of any second liquid present in the first liquid. Finally, the first liquid can exit the first outlet 352 via the first tube 350 with a relatively low amount of second liquid present, and with any undesired substances extracted to the second liquid.

Generally, the apparatus 100 can be utilized to mix various liquids such as extracting sulfur from a hydrocarbon, such as liquefied petroleum gas into a second liquid, often an immiscible liquid such as a water solution of sodium or potassium hydroxide. Generally, this process can operate at any suitable pressure and/or g-force, such as no more than about 10 g, or no more than about 1 g in the vortex zone, to facilitate the mixing and/or extraction of one component in a liquid into another for sweetening or purification. However, the g-force can vary depending on the location, such as in the passageway 254 of the swirler 240, and can exceed about 10 g.

Although the second liquid is disclosed as being introduced through the tube 210, it should be understood that the heavier liquid could be introduced directly into the first member 240. What is more, it should be understood that in some embodiments the vessel 200 may only contain one of the conical frustum 280 and the funnical frustum 290. Although the liquids are discussed being introduced to the vessel through the tube and shell construction, it should be understood that they be entered in any suitable manner, including not just through the head 212 but also through the side via the at least one wall 220. Generally, the liquids can enter the vessel 200 at any suitable temperature and pressure.

For an extraction process, the first liquid can exit as a hydrocarbon product that generally includes about 1-about 10 ppm, preferably no more than about 1 ppm, by weight, of, independently, a cation such as sodium associated with the alkaline liquid, and one or more sulfur compounds. However, it should be understood that several vessels can be used in series to ensure that the hydrocarbon effluent exiting the last vessel may contain no more than about 1 ppm, by weight, of, independently, the cation and one or more sulfur compounds.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. An apparatus for contacting a first liquid and a second liquid, comprising:
a vessel, wherein the vessel comprises:
A) at least one wall forming a perimeter about an interior space;
B) a first member positioned within the interior space wherein the first member forms a plurality of passageways wherein each passageway is defined by a first side and a second side from an outer region to an interior surface of the first member;
C) a funnical frustum positioned downstream of the first member to facilitate a swirling of at least one of the first and second liquids;
D) a splash member positioned upstream of the first member in the interior space for directing liquid toward the at least one wall wherein the funnical frustum is positioned downstream from the splash member; and
E) a distributor comprising a substantially circular plate positioned downstream from the funnical frustum.

2. The apparatus according to claim 1, wherein the first member is substantially ring-shaped.

3. The apparatus according to claim 1, further comprising a coalescer positioned downstream of the distributor.

4. The apparatus according to claim 3, wherein the coalescer comprises a mesh.

5. The apparatus according to claim 1, further comprising a first inlet for the first liquid and a second inlet for the second liquid wherein the first inlet and second inlet communicate the first and second liquids to the interior space.

6. The apparatus according to claim 5, wherein the first inlet forms a shell and the second inlet forms a tube inserted into said shell.

7. The apparatus according to claim 5, wherein the first inlet forms a shell and the second inlet forms a tube inserted into the shell.

8. A process for contacting first and second immiscible liquids in a vessel, comprising:
A) providing the first liquid into a tube entering a head of the vessel;
B) providing the second liquid into a shell surrounding the tube entering the head of the vessel;
C) passing the first and second liquids to a ring-shaped member forming a plurality of passageways from an outer region to an inner surface of the ring-shaped member;
D) passing the first and second liquids through a funnical frustum to a distributor; and
E) passing the first and second liquids from the distributor to a coalescer positioned downstream.

9. An apparatus for contacting a first liquid and a second liquid, comprising:
a vessel, wherein the vessel comprises:
A) at least one wall forming a perimeter about an interior space;
B) a first member positioned within the interior space wherein the first member forms a plurality of passageways wherein each passageway is defined by a first side and a second side from an outer region to an interior surface of the first member;
C) a funnical frustum positioned downstream of the first member to facilitate a swirling of at least one of the first and second liquids;
D) a splash member positioned upstream of the first member in the interior space for directing liquid toward the at least one wall wherein the funnical frustum is positioned downstream from the splash member;
E) a distributor positioned downstream from the funnical frustum; and
F) a coalescer positioned downstream of the distributor.

10. The apparatus according to claim 9, wherein the first member is substantially ring-shaped.

11. The apparatus according to claim 9, wherein the distributor comprises a substantially circular plate.

12. The apparatus according to claim 9, wherein the coalescer comprises a mesh.

13. The apparatus according to claim 9, further comprising a first inlet for the first liquid and a second inlet for the second liquid wherein the first inlet and second inlet communicate the first and second liquids to the interior space.

\* \* \* \* \*